United States Patent
Zhang

(10) Patent No.: US 11,072,542 B2
(45) Date of Patent: Jul. 27, 2021

(54) HIGH WATER EFFICIENCY TDS CREEP SOLUTION

(71) Applicant: A. O. SMITH CORPORATION, Milwaukee, WI (US)

(72) Inventor: Hai-Feng Zhang, Winchester, MA (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 364 days.

(21) Appl. No.: 16/250,139

(22) Filed: Jan. 17, 2019

(65) Prior Publication Data

US 2020/0231465 A1     Jul. 23, 2020

(51) Int. Cl.
*C02F 1/00* (2006.01)
*C02F 1/44* (2006.01)
*B01D 61/12* (2006.01)
*B01D 61/22* (2006.01)

(52) U.S. Cl.
CPC .............. *C02F 1/008* (2013.01); *B01D 61/12* (2013.01); *B01D 61/22* (2013.01); *C02F 1/44* (2013.01); *B01D 2311/06* (2013.01); *B01D 2311/246* (2013.01); *B01D 2311/25* (2013.01); *C02F 2209/03* (2013.01); *C02F 2209/10* (2013.01); *C02F 2209/40* (2013.01)

(58) Field of Classification Search
CPC .......... B01D 2311/06; B01D 2311/246; B01D 2311/25; B01D 2313/50; B01D 61/08; B01D 61/12; B01D 61/22; C02F 1/008; C02F 1/44; C02F 2209/005; C02F 2209/03; C02F 2209/10; C02F 2209/40; C02F 2307/10; C02F 4/441; C02F 4/442; C02F 4/444; C02F 2301/10; C02F 61/06
See application file for complete search history.

(56) References Cited

U.S. PATENT DOCUMENTS

| 4,000,065 A | 12/1976 | Ladha et al. |
| 4,344,826 A | 8/1982 | Smith |
| 4,354,939 A | 10/1982 | Pohl |
| 4,391,712 A | 7/1983 | Tyler et al. |
| 5,306,428 A | 4/1994 | Tonner |

(Continued)

FOREIGN PATENT DOCUMENTS

| JP | 200519309 A | 7/2005 |
| WO | 2007018561 A1 | 2/2007 |

*Primary Examiner* — Terry K Cecil
(74) *Attorney, Agent, or Firm* — Michael Best & Friedrich LLP

(57) ABSTRACT

A water purification system includes a tank which stores permeate during periods of standby during which impurities can migrate across a filtration membrane, resulting in impure water on the downstream side of the membrane. During an initial portion of a water draw immediately following a period of standby, the impure water on the downstream side of the membrane is used as a motive fluid to force the permeate out of the tank for delivery to the faucet. Permeate is provided on a continuous bases directly from the membrane to the faucet after the tank is depleted of permeate. The system includes a control system and a plurality of valves to recycle the impure water used as a motive fluid to the membrane to produce permeate. At the conclusion of a water draw, the tank is filled with permeate and the system enters a period of standby until the next water draw.

10 Claims, 8 Drawing Sheets

(56) References Cited

U.S. PATENT DOCUMENTS

| | | | |
|---|---|---|---|
| 5,647,973 A * | 7/1997 | Desaulniers | B01D 61/12 210/195.2 |
| 6,331,253 B1 | 12/2001 | Schrive et al. | |
| 7,189,325 B2 | 3/2007 | Wobben | |
| 7,550,088 B2 | 6/2009 | Wobben | |
| 8,206,581 B2 | 6/2012 | Richetti | |
| 8,257,594 B2 | 9/2012 | Astle et al. | |
| 2011/0315632 A1* | 12/2011 | Freije, III | B01D 65/02 210/636 |
| 2012/0267327 A1* | 10/2012 | Candelora | C02F 1/44 210/808 |

\* cited by examiner

HIGH WATER EFFICIENCY TDS CREEP SOLUTION

BACKGROUND

The present invention relates to a point-of-use water purification system having a recycling feature to efficiently counter TDS creep which occurs during standby.

SUMMARY

In one aspect, the invention provides a water purification system comprising: a water inlet and a water outlet for respectively delivering feed water to the system and drawing purified water out of the system; a pump moving feed water through the system under elevated pressure when the pump is activated, and not moving feed water through the system during standby periods when the pump is deactivated; a plurality of valves operable to control a flow path of the water through the system; a membrane having an upstream side and a downstream side and configured to receive elevated pressure feed water from the pump on the upstream side and remove impurities from the water as the water migrates across the membrane to the downstream side, water migrating to the downstream side of the membrane under elevated pressure being permeate having a concentration of impurities below a threshold level, wherein during standby periods when water is not under elevated pressure impurities migrate across the membrane from the upstream side to the downstream side to turn the permeate into impure water with a concentration of impurities above the threshold level; a tank configured to receive permeate from the downstream side of the membrane and to store a standby volume of the permeate for delivery to the outlet during an initial portion of a water draw immediately following a standby period; and a control system for activating the pump and manipulating the plurality of valves to use impure water displaced from the downstream side of the membrane as a motive fluid to displace permeate from the tank to the outlet during the initial portion of water draw, the control system manipulating the plurality of valves to recycle the motive fluid through the membrane to produce permeate, the control system refilling the tank to the standby volume of permeate after the end of a water draw.

In another aspect of the invention, water on the upstream side of the membrane is concentrate, the system further comprising a concentrate line communicating with the upstream side of the membrane for the flow of concentrate out of the membrane, the concentrate line including a drain portion for disposal of a portion of the concentrate and a return portion for the return of a portion of the concentrate to the upstream side of the membrane. The system may further comprise a composite valve regulating a flow rate of water in the concentrate line. The system may further comprise a divider in the tank to divide the tank into a permeate side and a recycle side, wherein the permeate is introduced to the permeate side and the impure water used as motive fluid is introduced on the recycle side. The system may further comprise a pressure sensor, wherein the control system uses pressure readings from the pressure sensor to determine when the tank has reached the standby volume. The system may use the pressure sensor to monitor a pressure of permeate in the tank. The system may further comprise a pressure sensor, wherein the control system uses pressure readings from the pressure sensor to determine when permeate has been completely depleted from the tank during the initial portion of the water draw, the control system manipulating the plurality of valves to deliver permeate directly from the membrane to the outlet after the permeate has been completely depleted from the tank. The pressure sensor may measure a pressure of the impure water used as a motive fluid. The system may further comprise a TDS sensor communicating with water downstream of the membrane, wherein the controller determines whether water downstream of the membrane is impure water or permeate based on readings from the TDS sensor. In another aspect of the invention, the controller operates the system in a first mode when the water draw is less than the standby volume and in a second mode when the water draw is greater than the standby volume. In the first mode the control system may recycle at least a portion of the motive fluid through the membrane to produce permeate after the end of the water draw and before refilling the tank to the standby volume of permeate.

In another aspect, the invention provides a method of operating a water purification system for purifying feed water, the system including a water inlet and a water outlet for respectively delivering feed water to the system and drawing purified water out of the system during a water draw, a pump, a membrane having an upstream side and a downstream side, and a tank, the method comprising: engaging the pump to elevate pressure of feed water; passing the elevated pressure feed water across the membrane from the upstream side to the downstream side to produce concentrate on the upstream side and permeate on the downstream side; filling the tank with a standby volume of the permeate; during standby when no water is drawn from the system disengaging the pump such that feed water is not at the elevated pressure and such that impurities migrate across the membrane from the upstream side to the downstream side to turn the permeate on the downstream side into impure water; during a water draw, engaging the pump to elevate the pressure of feed water and to elevate the pressure of the impure water; using the elevated pressure impure water as a motive fluid to displace permeate from the tank to the outlet during the initial portion of water draw; recycling the motive fluid through the membrane to produce permeate; and refilling the tank to the standby volume of permeate after the end of a water draw.

In another aspect, water on the upstream side of the membrane is concentrate, the method further comprising the step of disposing a portion of the concentrate and returning a portion of the concentrate to the upstream side of the membrane during a water draw. The method may further comprise the step of regulating a flow rate of the concentrate. The method may further comprise the step of dividing the tank into a permeate side and a recycle side with a divider, wherein step of using the elevated pressure impure water as a motive fluid includes introducing the motive fluid to the recycle side to force the permeate out the permeate side. In another aspect, the step of filling the tank includes determining when the tank has reached the standby volume by monitoring pressure of the permeate. The method may further comprise the steps of determining when the standby volume of permeate has been delivered from the tank to the outlet and then delivering permeate directly from the membrane to the outlet. In another aspect, determining when the standby volume has been delivered includes monitoring a pressure of the motive fluid. The method may further comprise monitoring an impurity level of water on the downstream side of the membrane during a water draw to determine whether the water on the downstream side is impure water or permeate, and supplying water directly from the membrane to the outlet when water on the downstream side is permeate. The method may further comprise operating the system in a first mode when the water draw is less than the standby volume and in a second mode when the water draw is greater than the standby volume. In another aspect, operating in the first mode includes recycling at least a portion of the motive fluid through the membrane to produce permeate after the end of the water draw and before refilling the tank to the standby volume of permeate.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
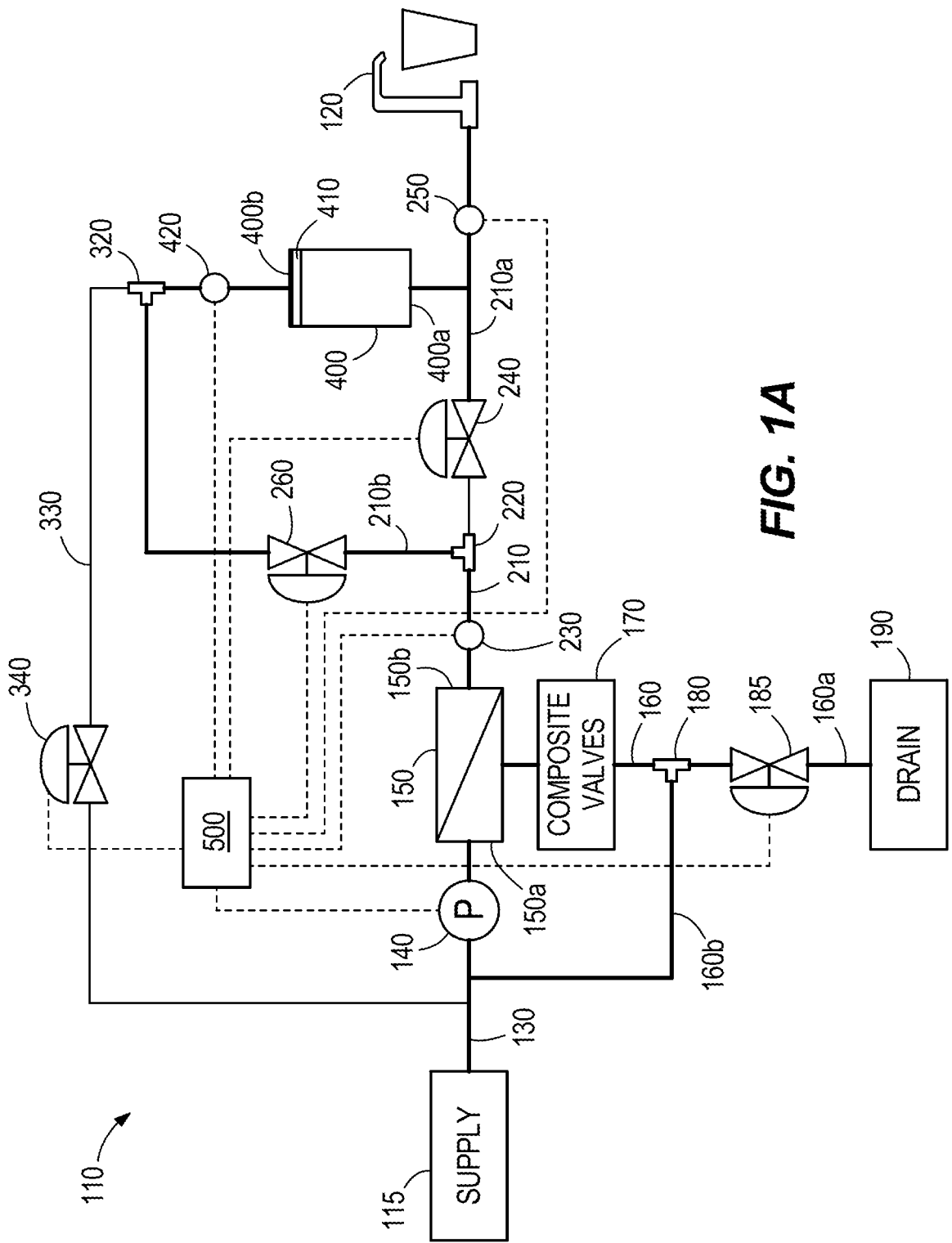
FIGS. 1A-1D are schematic representations of the water recycling system operating in a first mode of operation.
Figure 1B:
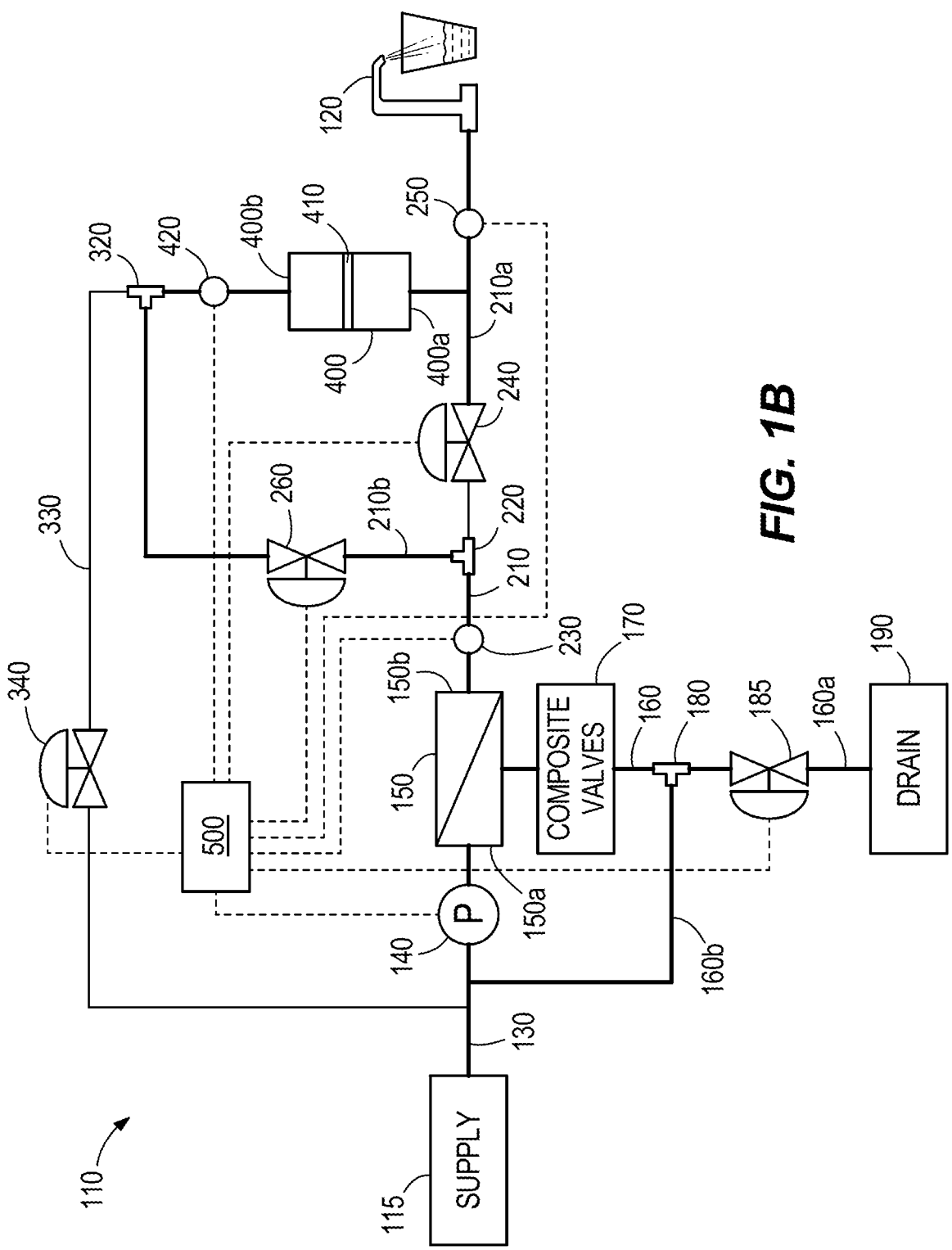
Figure 1C:
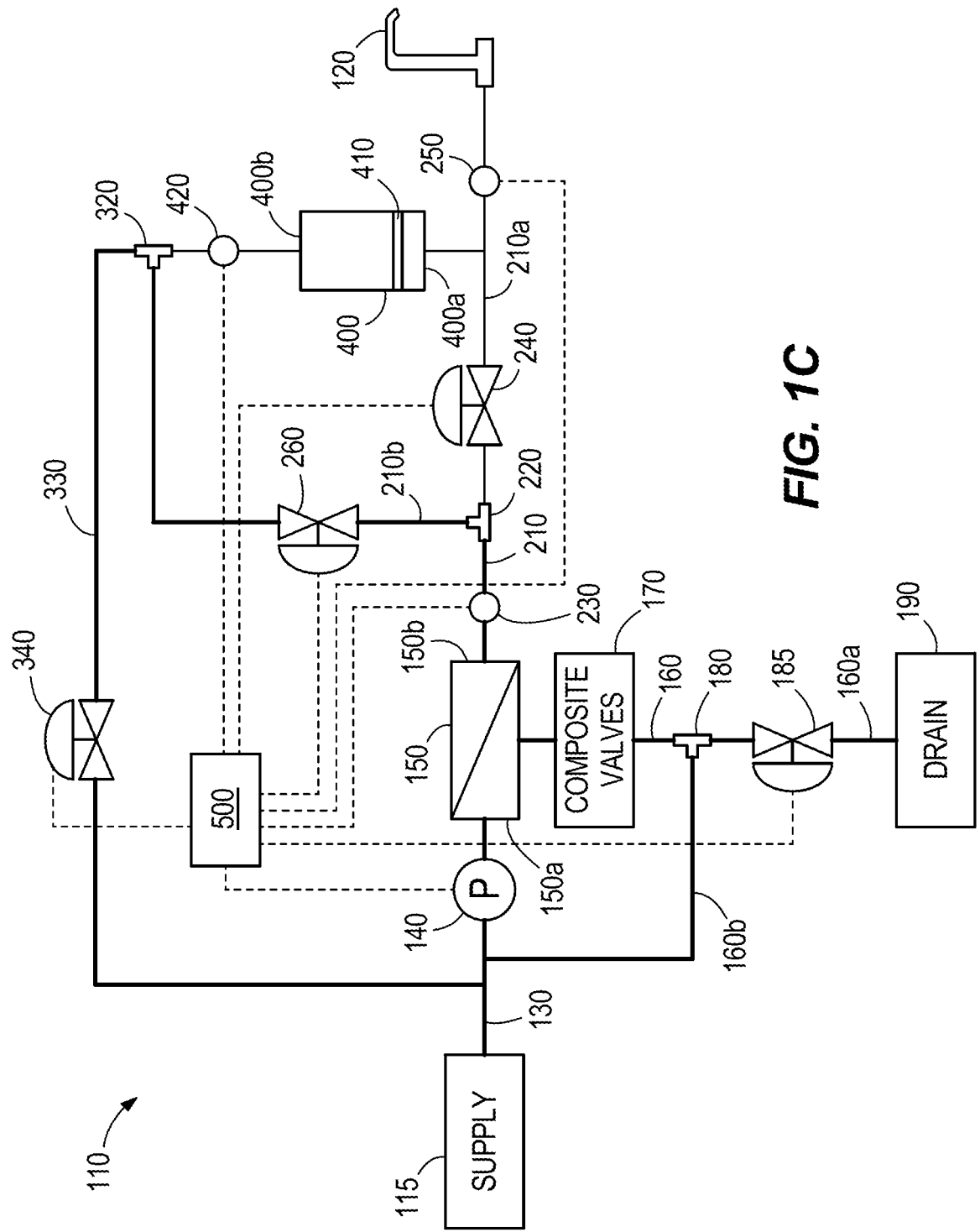
Figure 1D:
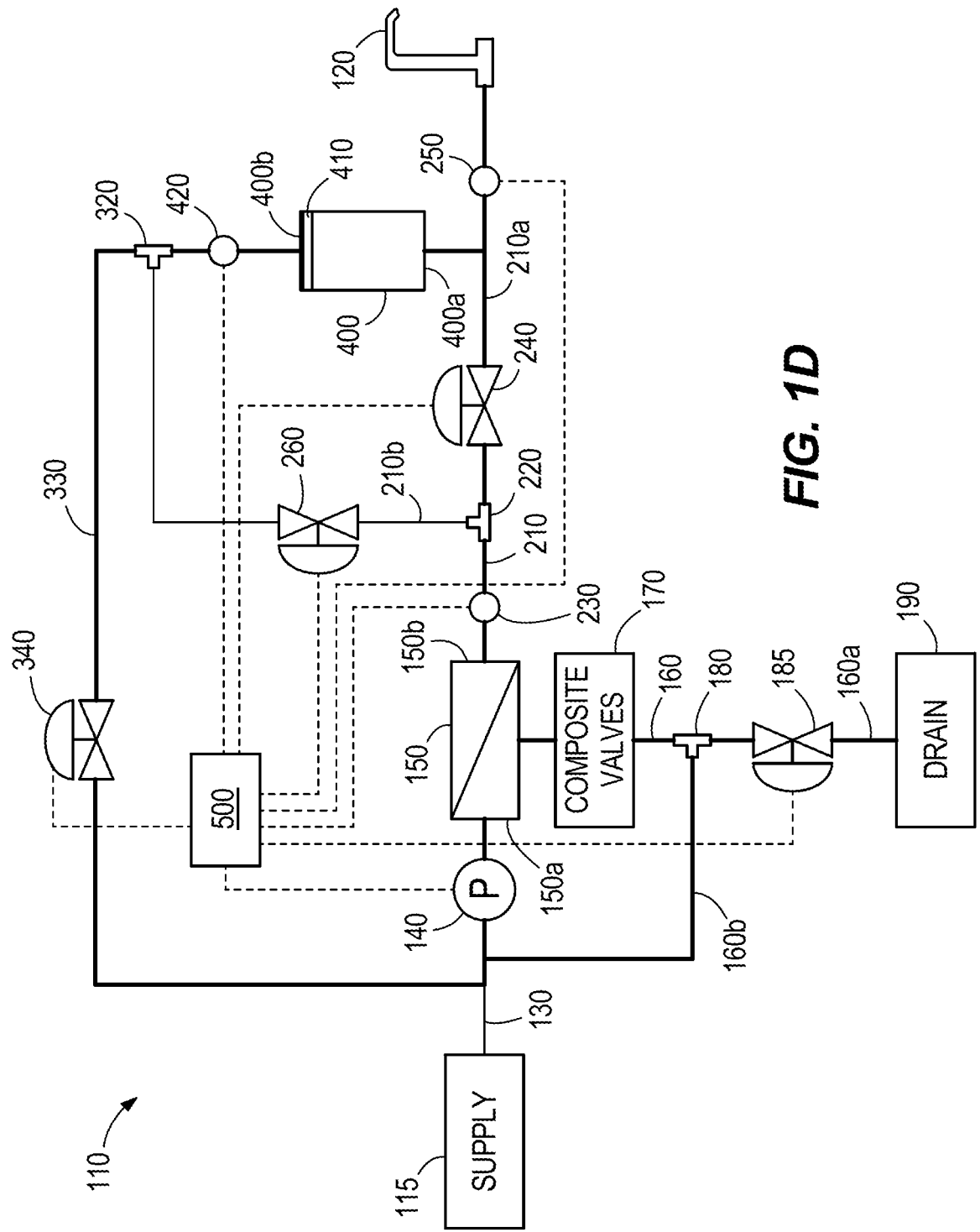
Figure 2A:
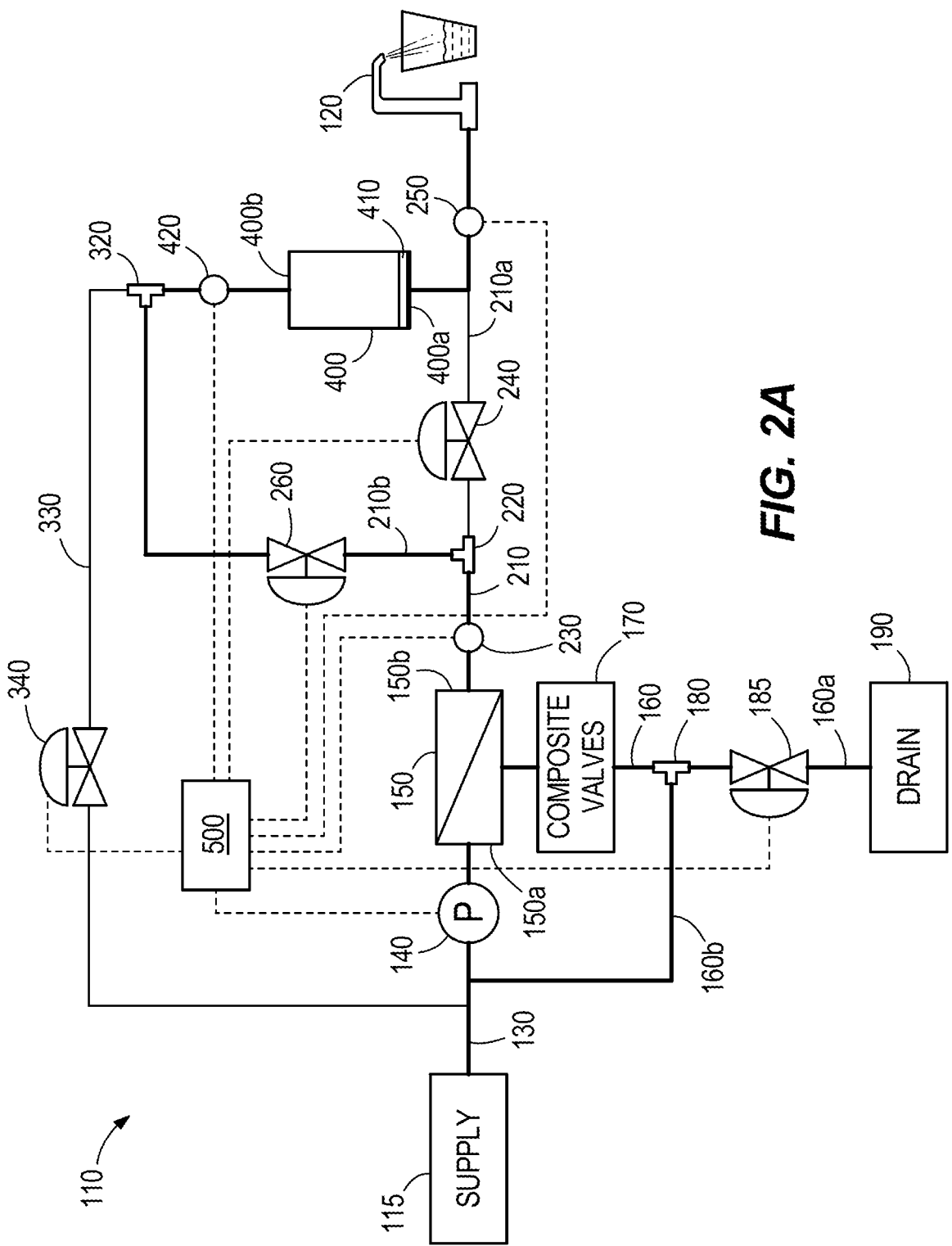
FIGS. 2A-2C are schematic representations of the water recycling system operating in a second mode of operation.
Figure 2B:
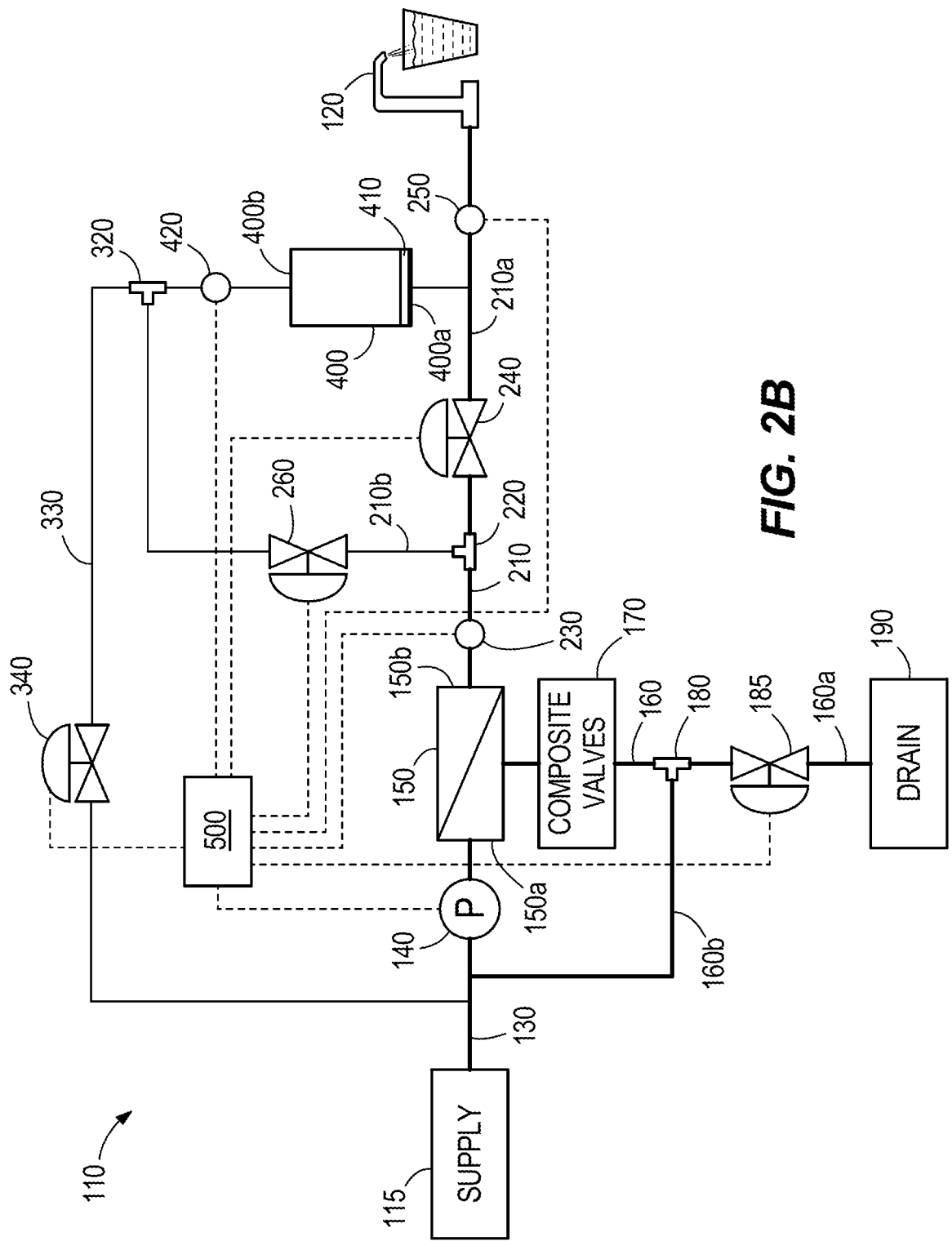
Figure 2C:
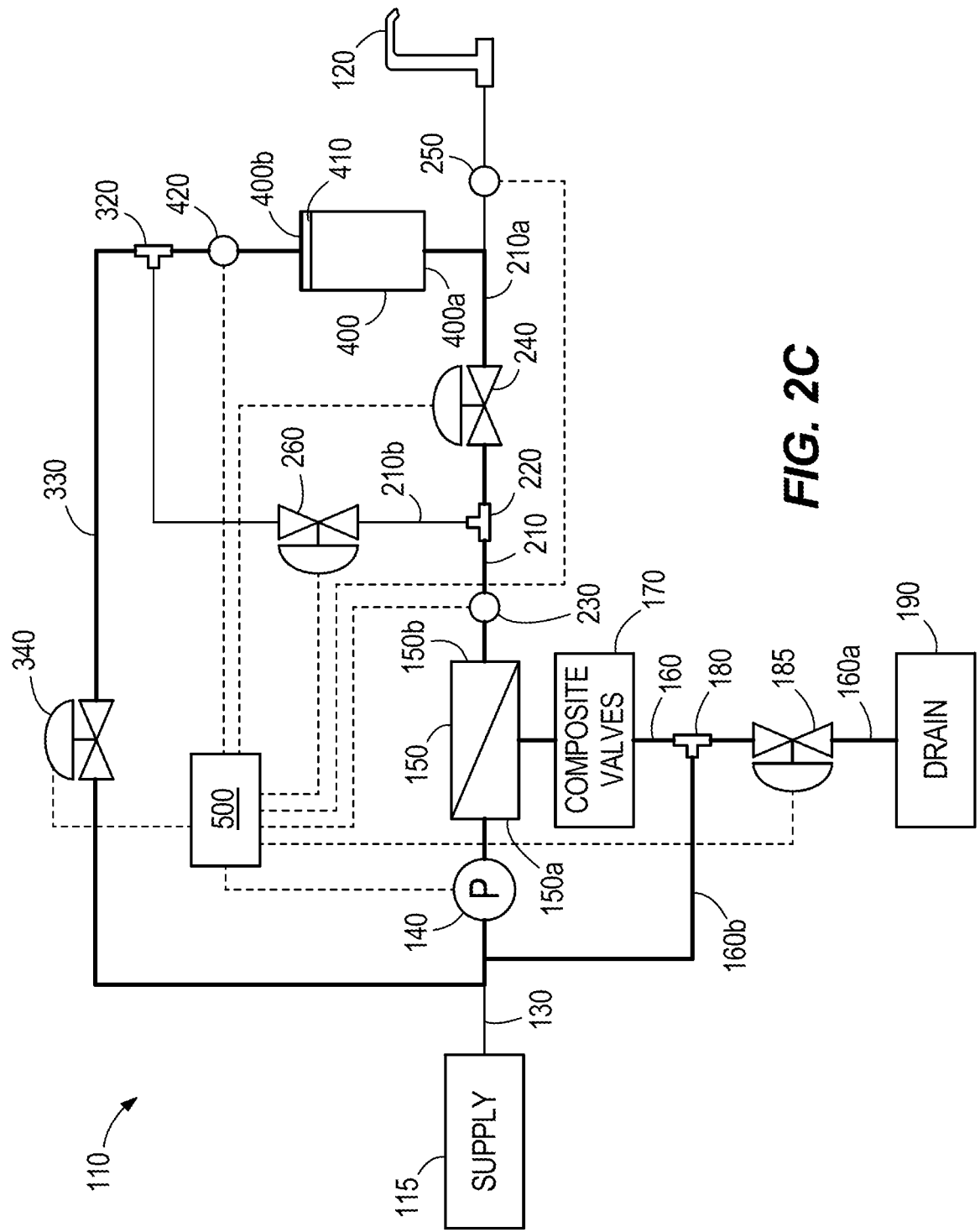

FIGS. 1A-1D and 2A-2C schematically represent a point-of-use water purification system 110. A first mode of operation is illustrated in FIGS. 1A-1D and a second mode of operation is illustrated in FIGS. 2A-2C. Before discussing the modes of operation, the components of the system 110 should be understood. The system 110 receives water (called "feed water") from a water supply 115 which may be a municipal water supply, a well or any other typical source of potable water, and delivers clean, purified water to a potable water output device such as a faucet 120. The feed water may be provided under typical head pressures for water supply systems. The water supply 115 and faucet 120 are illustrated schematically and are intended to include any water inlet and any water outlet for the system 110.

The major components of the system 110 include: a feed line 130, a pump 140, a membrane 150, a concentrate line 160, a composite valve 170, a concentrate tee 180, a drain valve 185, a drain 190, a permeate line 210, a permeate tee 220, a TDS sensor 230, an output valve 240, a permeate pressure sensor 250, a bypass valve 260, a recycling tee 320, a recycling line 330, a recycling valve 340, a tank 400, a recycle pressure sensor 420, and a control system 500. The control system 500 includes control logic to coordinate operation of the various other components. The specific control logic will be addressed after the following description of the major components.

The feed line 130 communicates between the supply 115 and the membrane 150. The pump 140 is positioned in the feed line 130. When activated, the pump 140 receives feed water from the supply 115, increases pressure of feed water to an elevated pressure, delivers the elevated pressure feed water to the membrane 150, and moves feed water through the system. The pressure provided by the pump 140 can be referred to as an elevated pressure to denote that the feed water may already be subject to head pressure from the water supply 115 system but that the pump 140 elevates the pressure above any such feed water pressure. When the pump 140 is deactivated, the system 110 is in a standby mode in which feed water and water throughout the system 110 is generally stagnant or not moving.

The membrane 150 includes an upstream side 150a communicating with the feed line 130 and a downstream side 150b communicating with the permeate line 210. The term "membrane" as used herein includes an actual membrane element with or without the surrounding structure such as a membrane canister, as will be clear from the context in which the term is used. Exemplary types of membranes which may be suitable for the system 110 include without limitation a semi-permeable membrane such as a reverse osmosis (RO) membrane, a nanofiltration membrane, an ultrafiltration membrane, a microfiltration membrane, or another type of membrane suitable for the design parameters of the system 110.

The membrane 150 receives elevated pressure feed water from the pump 140. The elevated pressure provided by the pump 140 causes the feed water to diffuse across the membrane 150 from the upstream side 150a to the downstream side 150b. Impurities, such as salts and dissolved solids accumulate on the upstream side 150a of the membrane 150. As a result, the water on the upstream side 150a includes a relatively high concentration of impurities and may be referred to as concentrate. The water on the downstream side 150b has a lower concentration of impurities and may be referred to as permeate. The concentration of impurities in the permeate depends on the type of membrane 200 employed, but a threshold concentration of impurities is established for a given membrane and as long as the concentration of impurities is below the threshold the water may be referred to as permeate.

During standby, when the pump 140 is deactivated and the feed water is not at elevated pressure, impurities will migrate across the membrane 150 from the upstream side 150a to the downstream side 150b. If, during standby, the concentration of impurities in the water on the downstream side 150a exceeds the threshold, the permeate will become impure water.

Effective operation of the membrane 150 often requires that the water flow along the upstream side 150a. The movement of feed water or concentrate along the upstream side 150a of the membrane 150 helps reduce scale formation on the upstream side 150a. The concentrate line 160 communicates with the upstream side 150a to facilitate such water movement. The composite valve 170 is in the concentrate line 160 and includes a flow control valve to maintain a constant flow rate through the concentrate line 160, which also causes a constant flow rate along the upstream side 150a. The concentrate tee 180 divides the concentrate line 160 into a drain portion 160a and a return portion 160b. The drain valve 185 is in the drain portion 160a and is controlled by the control system 500 to open or close the drain portion 160a to permit the flow of concentrate to the drain 190 as waste water. The drain valve 185 is normally open, but may be closed when initially filling the permeate line 210. The return portion 160b communicates with the feed line 130 upstream of the pump 140 or directly with intake of the pump 140 to return a portion of the concentrate to the inlet side 150a of the membrane 150.

The permeate line 210 communicates with the downstream side 150b of the membrane 150. The permeate tee 220 divides the permeate line 210 into an output portion 210a and a bypass portion 210b. The TDS sensor 230 is in the permeate line 210 downstream of the membrane 150 and communicates with the control system 500 to monitor impurities (e.g., total dissolved solids) in the permeate line 210. The TDS sensor 230 may be positioned, for example, immediately downstream of the membrane 150 and upstream of the permeate tee 220 as illustrated. In alternative configurations the TDS sensor 230 could be in the bypass portion 210b or even in the recycling line 330 as will become apparent when the purpose of the TDS sensor 230 is discussed below.

The output portion 210a of the permeate line 210 communicates between the permeate tee 220 and both a permeate side 400a of the tank 400 and the faucet 120. The output valve 240 is in the output portion 210a of the permeate line 210 and is controlled by the control system 500 to open and close the output portion 210a to permit or prevent flow of permeate to the permeate side 400a of the tank 400 and to the faucet 120. The permeate pressure sensor 250 is in the output portion 210a. The permeate pressure sensor 250 monitors and reports to the control system 500 the pressure of water in the output portion 210a of the permeate line 210, which correlates to pressure on the permeate side 400a of the tank 400 and at the faucet 120. The control system 500 may determine whether the faucet 120 is open or closed based on the pressure measured by the permeate pressure sensor 250. In other configurations of the control system 500, the faucet 120 may generate an electronic signal which is used to indicate when the faucet 120 is opened and closed, rather than or in addition to using the permeate pressure sensor 250 for this purpose.

The bypass portion 210b of the permeate line 210 communicates between the permeate tee 220 and the recycling tee 320. The recycling tee 320 places the bypass portion 210b of the permeate line 210, the recycling line 330, and a recycle side 400b of the tank 400 into three-way communication. The bypass valve 260 is in the bypass portion 210b of the permeate line 210. The bypass valve 260 is controlled by the control system 500 to open and close the bypass portion 210b to permit or prevent flow of water to the recycling tee 320. In another configuration of the system, which will be understood by those of ordinary skill in the art, the output valve 240 and bypass valve 260 can be combined into a single three-way valve at the location of the permeate tee 220. Such a three-way valve would perform the same function as the separate output valve 240 and bypass valve 260.

The recycling line 330 communicates between the recycling tee 320 and the feed line 130 upstream of the pump 140. The recycling valve 340 is in the recycling line 330 and is controlled by the control system 500 to open and close the recycling line 330 to permit or prevent flow of water from the recycling tee 320 to the pump 140.

The tank 400 may take the form of any receptacle or vessel which can store permeate during standby and from which permeate can be dispensed through the faucet 120 during an initial portion of a water draw. In this regard, the term "tank" is intended to be a very broad term encompassing all such receptacles and vessels. The tank 400 includes a divider 410 which separates the permeate side 400a from the recycle side 400b. The divider 410, which may take the form of a diaphragm, bladder, piston or any other suitable member, is sealed with respect to the tank 400 wall so that water cannot migrate across it between the permeate side 400a and the recycle side 400b under the pressures expected in the system 110. The permeate side 400a has a capacity referred to a standby volume. The standby volume can be a higher volume than what is expected for relatively short water draws from the faucet 120. In the example below, the standby volume is 600 mL.

The standby volume is sufficient to satisfy short water draws immediately following a standby period. As will be discussed, the permeate side 400a of the tank 400 is filled to the standby volume with permeate during system setup and after every draw from the faucet 120 to maintain the volume of permeate on the permeate side 400a at the standby volume during standby periods, when the faucet 120 is closed and the pump 140 is deactivated.

The recycle pressure sensor 420 is in the recycling line 330 and monitors and reports to the control system 500 the pressure of water on the recycle side 400b of the tank 400. The control system 500 may sense whether the recycle side 400b of the tank 400 is full (which may also mean that the permeate side 400a is depleted) based on the pressure measured by the recycle pressure sensor 420.

With particular reference to FIGS. 1A-1C, a first mode of operation of the system 110 (in which the user draws less than the volume of the tank 400) will now be described. In these illustrations, the conduits having water flow or water under elevated pressure are depicted with thicker lines than the conduits with no water flow. During a standby period of the system 110, the pump 140 is deactivated, the permeate side 400a of the tank 400 contains the standby volume of permeate (e.g., 600 mL in the present example), the bypass valve 260 and drain valve 185 are open, and the other valves (i.e., the faucet 120, output valve 240, and recycling valve 340) are closed. As noted above, during the standby period, impurities creep across the membrane 150 from the upstream side 150a to the downstream side 150b, with the result of total dissolved solids ("TDS") on the downstream side 150b potentially exceeding the threshold level at which the permeate becomes impure water.

FIG. 1A illustrates the system 110 at the beginning of the initial portion of the water draw from the faucet 120, immediately after a standby period. The term "initial period of water draw" means the portion, usually expressed in terms of volumetric flow, necessary to flush the downstream side 150a of the membrane 150 of impurities such that the water on the downstream side 150a is permeate. The instant that the faucet 120 is open, the control system 500 senses a pressure drop at the permeate pressure sensor 250 and engages the pump 140. The pump 140 causes elevated pressure feed water to flow from the supply 115, to the membrane 150. Impure water on the downstream side 150b of the membrane 150 is forced through the bypass portion 210b of the permeate line 210 and into the recycle side 400b of the tank 400. This impure water acting under the influence of elevated pressure from the pump 140 may be referred to as "motive fluid." Some concentrate flows out of the upstream side 150a of the membrane 150 through the composite valve 170 and the concentrate line 160. Some of the concentrate in the concentrate line 160 flows to the drain 190 via the drain valve 185 and the rest is routed back to the feed line 130 upstream of the pump 140.

FIG. 1B illustrates an intermediate moment during a water draw while the faucet 120 is open. The motive fluid on the recycle side 400b deflects the divider 410 to displace permeate stored on the permeate side 400a of the tank 400 through the output portion 210a of the permeate line 210 and out of the faucet 120. At the moment captured in FIG. 1B, for example, approximately half (i.e., 300 mL in the example) of the standby volume has been forced out of the permeate side 400a of the tank 400 and delivered to a receptacle through the faucet 120. The concentrate line 160 functions as noted above, with the composite valve 170 regulating the flow rate, some concentrate being routed back to the upstream side of the pump 140 and some concentrate being disposed of through the drain 190.

In FIG. 1C, the control system 500 determines that the faucet 120 has been closed when pressure increases at the permeate pressure sensor 250. In the present example, about two-thirds of the standby volume (i.e., about 400 mL) has been forced out of the tank 400 at the moment captured in FIG. 1C. The control system 500 opens the recycling valve 340 and continues to run the pump 140. The pump 140 forces feed water through the membrane 150, through the bypass portion 210*b* of the permeate line 210, into the recycling line 330, and back to the feed line 130 where the recycled water mixes with feed water and returns to the pump 140. This continues for a predetermined number of cycles, a predetermined period, or until the TDS sensor 230 confirms that the membrane 150 is producing permeate. The concentrate line 160 functions as noted above, with the composite valve 170 regulating the flow rate, some concentrate being routed back to the upstream side of the pump 140 and some concentrate being disposed of through the drain 190.

FIG. 1D illustrates the process after the control system 500 has determined that the membrane 150 is producing permeate out the downstream side 150*b*. The control system 500 closes the bypass valve 260, opens the output valve 240, and continues to run the pump 140. The pump 140 continues to force feed water through the membrane 150 to produce permeate, but the permeate is now directed into the output portion 210*a* of the permeate line 210. Because the faucet 120 is closed, backpressure develops in the output portion 210*a* and permeate enters the permeate side 400*a* of the tank 400. The control system 500 determines that the permeate side 410*a* has been refilled to the standby volume when the permeate pressure sensor 250 reaches a predetermined backpressure in the output portion 210*a*. As will be appreciated by those of ordinary skill in the art, in other configurations the control system 500 could use a flow rate sensor or flow volume sensor to determine when the permeate side 410*a* has been refilled rather than relying on the pressure sensor 250. The control system 500 then deactivates the pump 140 and the system 110 is in standby. Therefore, in the first mode the control system 500 recycles at least a portion of the motive fluid through the membrane 150 to produce permeate after the end of the water draw and before refilling the tank 400 to the standby volume of permeate.

With reference now to FIGS. 2A-2C, a second mode of operation of the system 110, in which the user draws more than the standby volume will now be described. As with the discussion above, the lines representing water conduits under pressure or with water flow are made thicker for illustration purposes.

FIG. 2A illustrates the system 110 in a similar condition to FIGS. 1A and 1B above (faucet 120, drain valve 185, and bypass valve 260 open and pump 140 activated), except that the water draw has continued until the standby volume (e.g., 600 mL) has been fully depleted. At this moment, the divider 410 has reached its maximum deflection and backpressure accumulates in the bypass portion 210*b*. The volume of motive fluid required to fully deflect the divider 410 and fully deplete the standby volume should be sufficient to also adequately flush the membrane 150 of impure water. If the membrane 150 is adequately flushed of impure water, it will be producing permeate on the downstream side 150*a* by the time the standby volume has been fully depleted, as illustrated in FIG. 2A.

In FIG. 2B, the control system 500 has recognized the backpressure with the recycle pressure sensor 420 and has closed the bypass valve 260 and opened the output valve 240. It will be appreciated that any water on the downstream side 150*b* of the membrane 150 will immediately be delivered to the faucet 120, which is why it is desirable that the standby volume be selected such that the volume of motive fluid to fully deplete the standby volume be sufficient to fully flush the membrane 150 as noted above. The membrane 150 and tank 400 may be sized and configured, for example, such that the volume of motive fluid required to fully deplete the standby volume in the tank and fully flush the membrane 150 is equal to the standby volume. The system 110 can run in the configuration of FIG. 2B as long as water is demanded at the faucet 120. The pump 140 forces a steady stream of feed water through the membrane 150 and to the faucet 120 through the output portion 210*a* of the permeate line 210 until the faucet 120 is closed.

FIG. 2C illustrates the permeate side 400*a* of the tank 400 being refilled after the faucet 120 has been closed. In response to the faucet 120 being closed, the control system 500 configures the system 110 the same way described above with respect to FIG. 1D. More specifically, the control system 500 opens the recycling valve 340 while leaving the output valve 240 open and continuing to run the pump 140. The pump 140 continues to force feed water (from the recycling line 330 and the supply 115) through the membrane 150 to supply permeate to the output portion 210*a* of the permeate line 210. Because the faucet 120 is closed, backpressure develops in the output portion 210*a* and permeate enters the permeate side 400*a* of the tank 400. The control system 500 determines that the permeate side 410*a* has reached the standby volume when the permeate pressure sensor 250 reaches a predetermined backpressure in the output portion 210*a*. The system 110 is now ready for standby.

Figure 3:
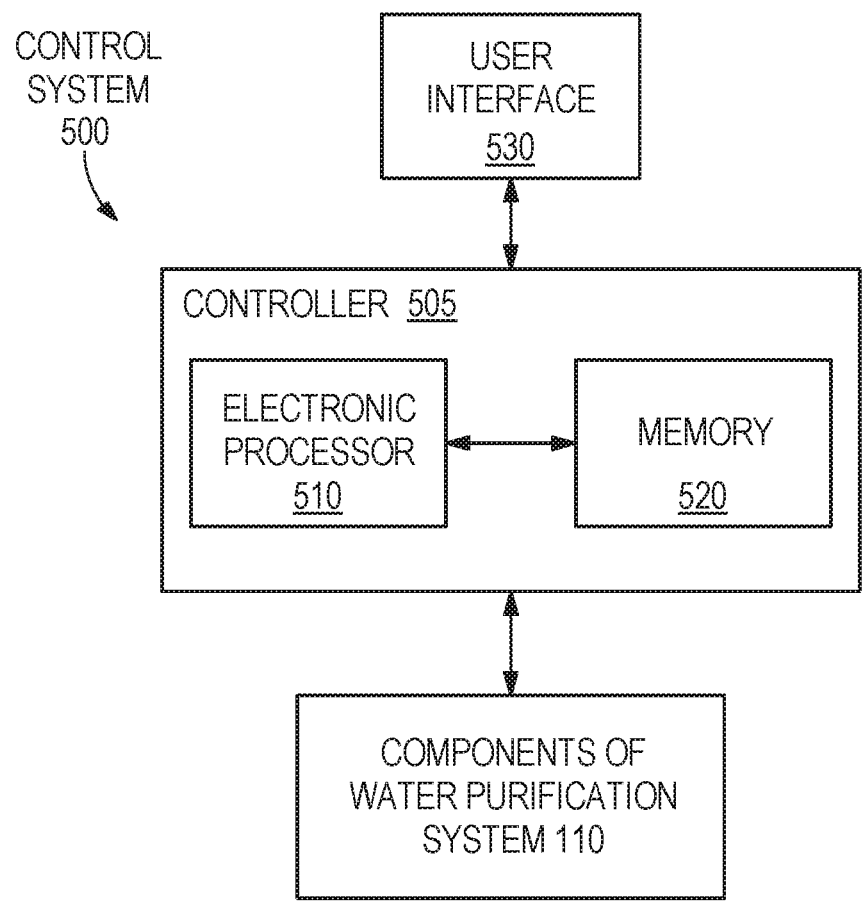
FIG. 3 is a representation of a control system for use with the water recycling system.

Referring now to FIG. 3, the control system 500 includes, among other things, an electronic processor 510 (e.g., a microprocessor, a microcontroller, or another suitable programmable device), and a memory 520. As illustrated here, the control system 500 communicates with a user interface 530 for input and output of commands and information from and to an operator of the system 110.

The memory 520 includes, for example, a program storage area and a data storage area. In some constructions, the memory 520 may be storage space in the cloud. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 510 is connected to the memory 520 and executes software instructions that are capable of being stored in RAM (e.g., during execution), ROM (e.g., on a generally permanent basis), or another non-transitory computer readable medium such as another memory or a disc. Software included in the implementation of the water purification system 110 can be stored in the memory 520 of the controller 505. The software includes, for example, firmware, one or more applications, program data, membranes, rules, one or more program modules, and other executable instructions. The controller 505 retrieves from memory 520 and executes, among other things, instructions related to the control processes and methods described herein. In other constructions, the controller 505 includes additional, fewer, or different components.

The optional user interface 530 may be used to control or monitor the water purification system 110. The user interface 530 includes a combination of digital and analog input or output devices required to achieve a desired level of control and monitoring for the water purification system 110. For example, the user interface 530 includes a display (e.g., a primary display, a secondary display, etc.) and input devices such as touch-screen displays, a joystick, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface 530 can also be configured to display conditions or data associated with the water purification system 110 in real-time or substantially real-time. For example, the user interface 530 is configured to display measured electrical characteristics of the water purification system 110 and the status of the water purification system 110. In some implementations, the user interface 530 is controlled in conjunction with the one or more indicators (e.g., LEDs, speakers, etc.) to provide visual or auditory indications of the status or condition of the water purification system 110. The optional user interface 530 may be a smartphone running an application configured to communicate with the control system 500.

Various features and advantages of the disclosure are set forth in the following claims.

What is claimed is:

1. A method of operating a water purification system for purifying feed water, the system including a water inlet and a water outlet for respectively delivering feed water to the system and drawing purified water out of the system during a water draw, a pump, a membrane having an upstream side and a downstream side, and a tank, the method comprising:
   engaging the pump to elevate pressure of feed water;
   passing the elevated pressure feed water across the membrane from the upstream side to the downstream side to produce concentrate on the upstream side and permeate on the downstream side;
   filling the tank with a standby volume of the permeate;
   during standby when no water is drawn from the system disengaging the pump such that feed water is not at the elevated pressure and such that impurities migrate across the membrane from the upstream side to the downstream side to turn the permeate on the downstream side into impure water;
   during a water draw, engaging the pump to elevate the pressure of feed water and to elevate the pressure of the impure water;
   using the elevated pressure impure water as a motive fluid to displace permeate from the tank to the water outlet during an initial portion of water draw;
   recycling the motive fluid through the membrane to produce permeate; and
   refilling the tank to the standby volume of permeate after the end of a water draw.

2. The method of claim 1, wherein water on the upstream side of the membrane is concentrate, the method further comprising the step of disposing a portion of the concentrate and returning a portion of the concentrate to the upstream side of the membrane during a water draw.

3. The method of claim 2, further comprising the step of regulating a flow rate of the concentrate.

4. The method of claim 1, further comprising the step of dividing the tank into a permeate side and a recycle side with a divider, wherein step of using the elevated pressure impure water as a motive fluid includes introducing the motive fluid to the recycle side to force the permeate out the permeate side.

5. The method of claim 1, wherein the step of filling the tank includes determining when the tank has reached the standby volume by monitoring pressure of the permeate.

6. The method of claim 1, further comprising the steps of determining when the standby volume of permeate has been delivered from the tank to the water outlet and then delivering permeate directly from the membrane to the water outlet.

7. The method of claim 6, wherein determining when the standby volume has been delivered includes monitoring a pressure of the motive fluid.

8. The method of claim 1, further comprising monitoring an impurity level of water on the downstream side of the membrane during a water draw to determine whether the water on the downstream side is impure water or permeate, and supplying water directly from the membrane to the water outlet when water on the downstream side is permeate.

9. The method of claim 1, further comprising operating the system in a first mode when the water draw is less than the standby volume and in a second mode when the water draw is greater than the standby volume.

10. The method of claim 9, wherein operating in the first mode includes recycling at least a portion of the motive fluid through the membrane to produce permeate after the end of the water draw and before refilling the tank to the standby volume of permeate.

* * * * *